Aug. 11, 1931.   A. H. MALLERY   1,818,901
PROCESS OF TREATING CARBONACEOUS MATERIALS TO PRODUCE GASEOUS MIXTURES
Original Filed Nov. 19, 1926
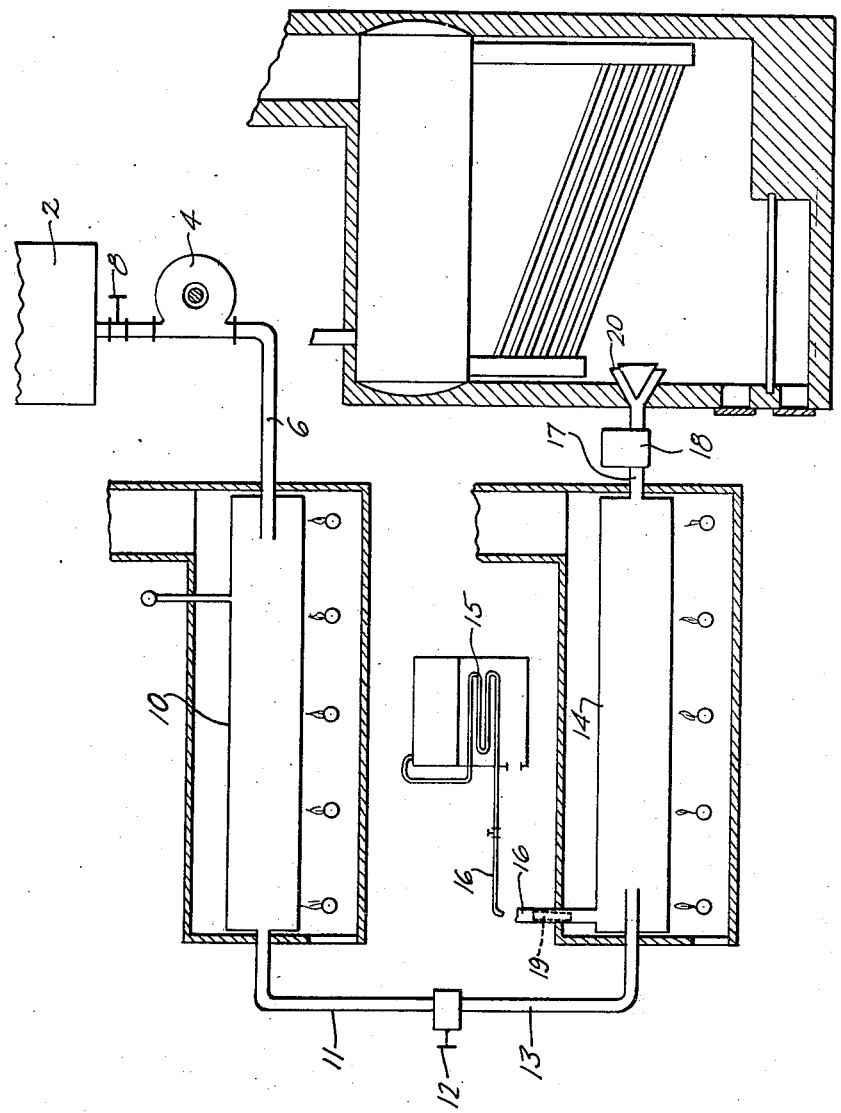
INVENTOR
ARLINGTON H. MALLERY
BY
Newell & Spencer
ATTORNEYS Patented Aug. 11, 1931

1,818,901

UNITED STATES PATENT OFFICE

ARLINGTON H. MALLERY, OF POUGHKEEPSIE, NEW YORK, ASSIGNOR TO MALLERY PROCESS CORPORATION, OF NEW YORK, N. Y., A CORPORATION OF DELAWARE

PROCESS OF TREATING CARBONACEOUS MATERIALS TO PRODUCE GASEOUS MIXTURES

Application filed November 19, 1926, Serial No. 149,516. Renewed June 19, 1930.

The present invention relates to the treatment of carbonaceous materials to produce a gaseous mixture which either may be immediately burned or may be treated to derive hydrocarbon liquids or combustible gases. The invention is intended particularly for the treatment of residuums from oil refineries, bottom sediments and acid sludges either with or without water and the so-called "black liquor" wastes or sulphite liquors formed in the wood pulp industries. The process may also be advantageously employed in producing hydrocarbon liquids of low boiling points or of low melting points.

As to common subject matter, the invention is a continuation in part of my application, Serial No. 99,938, filed April 5, 1926 on a method of utilizing residue oils containing water. In the production of gasoline from crude oils and other mineral oils, various oil residues are produced which are a source of great inconvenience and loss to the refiner for the reason that no economical way has been devised to dispose of the residues and it has been the practice to store such residues by allowing them to accumulate in a pond or excavated hole. The acid sludges obtained by treating the distilled products from the mineral oil with acid, so as to remove the unsaturated carbons and other impurities, are particularly obnoxious on account of the odor and the tendency to form emulsions which it is almost impossible to break up. After the treatment of the various oil fractions with acid, fractions are generally washed with water to remove remaining amounts of acid and a part of these washings are generally added to the acid sludge.

Many attempts have been made to devise a method by which the emulsions may be broken up so as to recover the oil therein, but such processes have been found to be costly and, for certain refractory emulsions, have been found to be wholly inoperative.

As a result of a large number of experiments, I have discovered a method by which oil residues containing water or colloidal carbon or both may be utilized and which is applicable to all grades or emulsions of oil and water up to substantially 80% of water. The method is in fact, applicable to emulsions containing even higher percentages of water, although it is doubtful whether oil emulsions containing such higher percentages of water may be economically treated. It is to be understood, however, that my method is applicable to the treatment of all such emulsions. Furthermore, the method is particularly adapted for the treatment of acid sludge and is of particular advantage in this connection for the reason that the sulphuric acid employed for washing mineral oils, through which the acid sludge is obtained, may be recovered and utilized again for the treatment of oil fractions or for any other suitable purpose.

Certain residues are also difficult to utilize because this carbon content is either in a colloidal form or else contains carbon grits.

A very large quantity of "black liquor" or other waste liquors are annually obtained in the manufacture of pulp, particularly in the chemical process for the treatment of wood in the manufacture of pulp. The "black liquor" obtained is usually dark-brown or black and contains non-cellulose matter such as lignin and resins, and some cellulose and other material. The liquor is produced in large quantities and should not be disposed of by dumping or feeding into streams because of the danger of pollution. The question of disposal of the "black liquor" and other waste material from the paper and pulp industry has been a very serious problem and heretofore no satisfactory method of disposing of the material has been discovered.

The primary object of the present invention is to provide a method by which such fuels containing water may be utilized and disposed of with profit.

Another object of the invention is to provide a method of treatment of liquids containing residue oils and water, hydrocarbon oil and emulsions, acid sludges composed of carbon and acids or alkalis, with or without water, to obtain the heat value from the oil therein or to recover one or more valuable constitutents as by-products.

Another object of the invention is to provide a method of treatment of "black liquor" or similar liquors by which the combustible material in a liquor may be utilized and which will also admit of the recovery of inorganic constituents therein.

Another object of the invention is to provide a method of treatment of oil, coal, coke or tar derived from coal, by which fluid hydrocarbons of a lower boiling point or lower melting point may be obtained.

With these and other objects in view, the invention consists in the process of treatment of materials of the character described, comprising the novel and improved features hereinafter described and particularly pointed out in the claims, the advantages of which will be readily understood and appreciated by those skilled in the art.

In carrying out the present invention, when the gaseous mixture produced is to be burned, the liquid containing combustible material is brought into contact with superheated steam or other superheated gas at a relatively high temperature and the mixture thus formed is maintained at a high temperature until it is introduced into the combustion chamber. The temperature thus maintained is at, near or above the kindling temperature of the combustible material. The mixture thus formed by the contact of the liquid with superheated steam is preferably maintained at a high temperature by heat from a source other than that of the superheated steam. The temperature to which the steam is heated should be at least 900° F. and I preferably employ a temperature in the neighborhood of 1250° F., although temperatures up to and above 2000° F. may be employed and have been found to be advantageous under the particular conditions of operation. In place of steam some other fluid medium, a single gas or a mixture of gases might be employed, such for example, as carbon dioxide, a mixture of steam with water gas, consisting mainly of carbon dioxide and hydrogen, or a mixture of steam with permanent gases obtained in the cracking of oil, or other suitable gases may be employed.

The mixture resulting from the bringing of the liquid under treatment into contact with superheated steam is preferably heated also to a temperature of approximately 1250° F., although any temperature may be employed such that when air at ordinary temperature is introduced into the mixture, the resulting temperature will be at, near or above the kindling temperature of the combustible material.

I find that as a practical lower limit, the temperature of the mixture should be at least 900° F., but the temperature of the mixture may even exceed 1250° F., and temperatures as high as 2000° F. may be satisfactorily employed in some cases.

Before being brought into contact with the superheated steam, the liquid under treatment is preferably heated to a temperature sufficiently high to enable the same to be easily forced through the pipes of the system. The liquid is preferably heated to a temperature just below the boiling point. If desired, the liquid under treatment, before being brought into contact with superheated steam may be heated to a temperature sufficiently high to gasify the oil or other carbonaceous material and to vaporize the water in the mixture.

While the liquid under treatment is being brought into contact with superheated steam, variations in pressure, temperature, velocity of travel and concentration of the gaseous mixture are produced continuously and simultaneously in the mixing chamber before the mixture passes to the burner in order to accelerate the reactions. These variations in pressure, temperature, velocity of travel and concentration may be produced in various ways but are preferably produced by allowing the gaseous mixture to be discharged intermittently from the chamber. Because of this intermittent discharge, it is possible to retain part of the mixture in the chamber under a varying pressure and temperature, both of which facilitate proper heating and mixing of the material and render it more readily combustible. Hydrocarbon molecules of different size and composition have different kindling temperatures and the points at which they most readily decompose vary, and also the kindling temperature and point of decomposition vary with the pressure and degree of concentration. By constantly varying the temperature, pressure and concentration of a mixture, all the molecules in the mixture can be subjected to the conditions under which they most readily decompose to smaller molecules. The smaller the molecule and the nearer its components are to single atoms, the more readily it can be burned or combined with other molecules or atoms to form a desired gas.

Agitation and stirring of any mixture is very conducive to bringing about new combinations of molecules and atoms, and by varying the velocity of the gases in their pasasge through the heated chamber, together with changes in the temperature, pressure and degree of concentration, much better results are obtained than with ordinary mechanical agitation.

The intermittent action either in feeding the material to the chamber or passing the gases from the chamber, is carried on at intervals just sufficient to produce the desired variations in pressure and velocity of travel.

As stated above, the variations in pressure, temperature, velocity of travel and concentration of the gaseous mixture in the mixing chamber are preferably produced by allowing the gaseous mixture to be discharged intermittently from the chamber under control of a valve. When the valve is closed, the pressure and temperature of the gases in the mixing chamber rise progressively, the concentration of the mixture is correspondingly increased, and the velocity of travel is reduced, this velocity being zero at the discharge opening. Upon the opening of the valve, the pressure and temperature of the mixture in the mixing chamber is reduced as is also the concentration of the mixture and the velocity of travel of the gases is increased, this velocity being greatest at the discharge end of the chamber. Corresponding results may be produced by a valve mechanism in which the valve is only partially closed but the valve is operated to increase and diminish the size of the discharge opening. The valve may be automatically operated and controlled by the pressures within the mixing chamber and may be operated to close the same when a predetermined low pressure is reached and to open the valve when the pressure has been built up to a predetermined high pressure. The valve also may be mechanically operated at regular intervals whereby it is opened and closed so as to increase or diminish the size of the discharge opening. When a valve is employed in which the size of the discharge opening is increased and diminished at intervals, this will produce variations in the volume and velocity of travel of the gases passing from the chamber. Also when a valve is employed which is automatically operated and controlled by the pressures within the mixing chamber, this valve may operate to increase and diminish the size of the discharge opening to produce the required results.

The variations in pressure, temperature, velocity of travel and concentration of the gaseous mixture in the mixing chamber may also be produced by an intermittent feed of the material to be treated into the mixing chamber or by changes in the rate of feed. Also these variations may be produced by an intermittent feed or by a variation in the feed of the steam into the mixing chamber. The feed of the material to be treated or the feed of the steam may be controlled by the pressures within the mixing chamber or the controlling mechanism for these feeds may be mechanically operated at regular intervals to vary the feed or to open and close the feed valves.

When the liquid under treatment contains oil, by the contact of the liquid with superheated steam, the oil in the liquid becomes more or less cracked, whereby a large amount of heat is absorbed, the operation of cracking being an endothermic reaction.

After the thorough mixing of the gases produced by the contact of the liquid with superheated steam, the gaseous mixture may be passed to a burner where it contacts directly with air supplied in sufficient amounts to cause substantially complete combustion of the combustible material in the mixture. The amount of air supplied should be regulated so as not to supply substantially more than is needed for complete combustion because of the consequent loss of heat due to the heating of inert gases not used in the reaction. The burning gases may be utilized to heat a steam boiler or any other body to be heated, and by regulating the amounts of materials used, the combustion of the combustible materials in the liquid treated is accomplished without unnecessary waste of heat.

It is obvious that by this process the only loss of heat involved in the operation over the usual method employed for the burning of fuel oils or other carbonaceous materials which contain no water is that represented by the amount of heat necessary to evaporate any water present in the liquid which is used, plus the heat which is required in raising the temperature of the water from that of the liquid to a vaporizing temperature and in addition, the heat absorbed by the steam which is formed from the water, in raising its temperature up to that of the gases leaving the stack. By this process, carbonaceous liquids containing water up to 80% may be utilized in the manner described. By this process, oils and residuums which have heretofore been considered of small value or a total loss to the refiner may be satisfactorily utilized.

With a fuel containing colloidal carbon, grits or similar material, the mixing of the gases and steam at or near the kindling temperature, together with their agitation for a period of time at that temperature before passing to the combustion chamber, transforms them into combustible gases.

Material which is fed into the combustion zone of the furnace in which combustion takes place is preferably passed through an intermittently operated valve. I preferably employ a valve which is self-regulating and which admits charges into the combustion chamber several times a minute in such a manner that as the charges are expelled into the combustion chamber, they are at once surrounded by sufficient air to maintain the combustion in proximity to the point of exit, whereby the heat of combustion may be used in the preheating of the steam and heating of the material in a retort to a relatively high temperature before being passed into the combustion chamber.

The drawing illustrates somewhat diagrammatically a system by which the present process may be carried out in an efficient and satisfactory manner. As shown in the drawings, the liquid to be treated is contained in a tank indicated at 2 from which it is pumped by means of a pump 4 through a pipe 6 having a valve 8 therein for controlling the flow of the liquid. The liquid flows from the pipe 6 into a pipe coil or retort 10 in which the liquid may be preheated to any desired temperature. As stated above, the liquid is preferably preheated to a temperature just below its boiling point and pressure is maintained in the preheating retort. From the retort 10, the liquid passes through a discharge pipe 11 and reducing valve 12 and a second pipe 13 into a second retort 14. In passing through the reducing valve 12, the pressure is dropped to any pressure desired so that the liquid is delivered to the retort 14 under this pressure. I have operated with pressures varying from less than one pound to over 100 lbs. per square inch in the retort 14 by means of which satisfactory operation was obtained. In the retort 14 the liquid is brought into contact with superheated steam. This steam is delivered from a heated steam coil indicated generally at 15 into the retort 14 through a pipe 16. The steam delivered into the retort 14 should be heated to a temperature about 1200° F. to produce satisfactory results, and is preferably delivered at a temperature of about 1400° F., at which temperature the bond between the hydrogen and oxygen of the steam is weakened and decomposition into its elements is accelerated. When the liquid being treated contains oil, by the contact of the liquid under treatment with the superheated steam, the oil in the liquid becomes more or less cracked, thereby absorbing a large amount of heat and it is believed that the hydrocarbons in the liquid become gasified so that a mixture of vapor and gases is formed in the retort 14.

In order to accelerate the reactions occurring in the retort 14 and also to insure the gasifying of the hydrocarbons in the liquid delivered to the retort 14, continuous and simultaneous variations in pressure, temperature, velocity of travel and concentration of the mixture are produced in this retort. These variations in pressure, temperature, velocity of travel and concentration are preferably produced by intermittently allowing the discharge of the mixture of gases and vapor from the retort 14. This retort is preferably provided with a discharge pipe 17 in which is mounted an intermittently operating valve indicated diagrammatically at 18. This valve may be of the same general construction and mode of operation as the valve shown and described in applicant's Patent No. 1,471,519 dated October 23, 1923. This valve is controlled by the pressure of the mixture of gases and vapor within the retort 14 and operates intermittently to close and open the discharge pipe 17. When the pressure within the retort 14 falls to a predetermined amount on account of the opening of the valve, the valve is automatically closed. Upon the closing of the valve, the pressure begins instantly to build up within the retort 14, until when a predetermined pressure is reached, the valve again opens, allowing the discharge of the vapor and gases through the pipe 17. This building up of pressure in the retort 14 produced by the gasification of the hydrocarbons in the liquid and by the vaporization of the water therein, cuts off the flow of the liquid through the pipe 13, and also cuts off the flow of steam into the chamber. When the pressure in the retort 14 reaches a predetermined high point, the valve is automatically opened. Upon the opening of the valve, the pressure within the retort falls and the liquid to be treated is again forced through the pipe 13 and the steam again flows into the retort.

The following is a concrete illustration of the cycle of operations occurring within the retort 14 and associated parts of the system.

Operating at a pressure of the steam and material being treated of 10 lbs., for example, (means being provided for regulating the feed of these materials to produce a balance in the pressure which can be determined by the operator) assume a point in the cycle at which the piston of the valve is closed and the internal pressure in the mixing chamber has reached 25 lbs., this pressure acting on the check valves of the respective lines through which the steam and the material to be treated are fed, will close these valves, or if no check valves are employed, this pressure will slowly force the steam and the material to be treated back in these feed lines. At the same time, this 25 lbs. pressure will force the piston of the discharge valve back and leave a wide opening for the gases to escape. The pressure in the discharge end of the mixing chamber will drop rapidly and as the gas from the entrance end of the chamber moves forward to replace it, pressure at that end drops and hydrogen and oxygen from the steam also move into the mixing chamber. The entrance end of the mixing chamber is the last to get the drop in pressure.

As the pressure of the gases in the discharge end of the mixing chamber drops below 10 lbs., the pressure of the material being fed into the mixing chamber overcomes the pressure of the gas and actuates the piston to close the valve. As the pressure at the inlet end of the mixing chamber drops below 10 lbs., the material to be treated immediately spurts into the chamber. As it splashes into the hot chamber, it explodes in the atmosphere of hydrogen and oxygen which have moved forward from the steam generator, replacing the gases which have previously been carried toward the discharge end of the mixing chamber. With the explosion of the volatile ingredients of the oil or other substances in the material being treated in the hydrogen and oxygen, the expanding gas produces a high pressure which forces open the piston of the discharge valve. The pressure at which the material to be treated and steam are forced into the retort may be varied as desired and this pressure, together with the relative areas of the parts of the valve piston exposed to the pressure of the material or the feed pressure and of that part exposed to the pressure of the gases in the retort determines the pressure which said gases will reach to open the valve. Thus the valve will be opened and closed at predetermined pressures depending upon the pressure at which the material is forced into the retort and the valve structure.

Instead of a valve of the construction and mode of operation shown and described in applicant's Patent No. 1,471,519, a mechanically operated valve may be employed which is actuated at regular intervals to open and close the discharge opening from the retort 14 or to increase and diminish the size of the discharge opening.

The mixture in the retort 14 is heated to a relatively high temperature preferably by heat received from an external source. This temperature should be above 900° F. and a temperature in the retort of 1250° F. has been found to produce highly satisfactory results.

In order to accelerate decomposition of the steam and to increase the rapidity of the chemical action between the hydrogen and oxygen of the superheated steam and the elements of the gases produced from the carbonaceous material introduced into the mixing chamber, a catalytic agent 19 is placed preferably in the steam line adjacent the mixing chamber. This catalytic agent may consist of any suitable metallic or other catalytic material and may be sieve-like in form or of any other form, presenting a relatively large surface area for the contact with the gases. The alternating variations in pressure produced in the mixing chamber alternately drive the hydrocarbons in the mixing chamber over the surfaces of the catalyst into the steam line and cause the mixture of carbon, hydrogen, oxygen and their combinations to be driven back over the surfaces of the catalyst as the pressure rises and falls. This brings the steam and the hydrocarbon gases alternately into contact with the catalyst so as to promote the combination of the hydrogen and oxygen of the steam with the carbon of said gases. The contact of the steam with the catalyst weakens the bond between the hydrogen and oxygen atoms and promotes their combination with the carbon.

Because of the high temperature produced in this retort, the gaseous and vaporous mixture reaches the burner or furnace at a temperature sufficiently high that when mixed with air in the proper proportions for satisfactory combustion, the final mixture of air, gases and vapor is still at or near the kindling temperature of the carbonaceous material under the existing conditions. The mixture of gases and vapor passes from the pipe 17 through a suitable burner opening 20 into a stream of air regulated in amount so as to obtain substantially complete combustion of the oil or other carbonaceous material. The opening 20 may be under a boiler or furnace, for example, whereby the air passing into contact with the products expelled from the opening may be regulated in the usual manner.

When it is desired to utilize the gases other than by burning the same immediately, they are passed from the chamber to storage or condensing chambers for treatment. When the gases are to be burned immediately, it is sufficient to maintain the same near the kindling temperature of the combustibles in the material as well as at or above this temperature until the gases reach the burner. When the gases are not to be immediately burned, but are passed into storage tanks for treatment, a higher temperature in the mixing chamber is sometimes advantageous. Under these conditions, the temperature in the mixing chamber may be maintained at or above the kindling temperature of the combustibles in the material, the temperature used depending on the product desired.

In the treatment of carbonaceous mixtures carrying large quantities of water, I may add or mix therewith as desired, oils or residues such as fuel oil in order to maintain substantially uniform conditions of operation or to increase the economy of the process. I have found that the present method is particularly adapted for the treatment of acid sludges such as are obtained by the washing or treatment of various fractions of oil by means of sulphuric acid. The sulphuric acid compounds which are formed with unsaturated hydrocarbons in the treatment of the oil fractions comprise sulphonates which are soluble in water and may thus be washed out of the oil, the various oils, such as gasoline, kerosene or lubricating oils being, as is well known, insoluble in water. In the treatment of the various oil fractions with sulphuric acid, more or less of the saturated hydrocarbons become emulsified in the acid sludge and a small amount is thus removed with the sludge.

I preferably treat the sludge by one of the methods of treatment described above in connection with the treatment of residue oils containing water. If the oil sludge contains a large proportion of sulphuric acid, I may if desired, omit the abstracting of the heat from the gases when combustion takes place and instead of burning the gases in contact with a steam boiler or other body to be heated, I may cool the gaseous products of the combustion directly by means of a condenser. By this treatment the water present in the gases formed during combustion by the union of oxygen of the air with the combined hydrogen of the oil and also that which was originally present in the sludge is separated out. Through the combustion of the oil, inert gases are formed and the sulphur trioxide and any sulphur dioxide formed in the reaction will be absorbed in the water present when the gases are passed through the condenser. The gases may, if desired, be passed into contact with air from an outside source to absorb any remaining sulphur trioxide or sulphur dioxide in the gases issuing from the condenser. It is to be understood that I preferably abstract the heat from the gaseous products of combustion by burning the mixture of gases delivered to the burner or furnace in contact with a steam boiler or other body by means of which the heat in the gases may be utilized before abstracting sulphur trioxide for the recovery of the sulphuric acid originally in the sludge.

Certain oil sludges which do not contain acid, particularly those obtained by washing mineral oil fractions with alkali may also be treated in the manner above described, utilizing the heat of the combustion of the oil in the sludge by heating a boiler or still or other device by means of which the heat is abstracted, but in this case, the gases are permitted to escape into the atmosphere after the heat is abstracted therefrom.

In the treatment of certain waste liquors, liquids or other waste material having a very low content of combustible material, I may if desired, add materials of a combustible nature such as powdered coal, fuel oil or oil residues or gases such as water gas or oil gas or other material adapted for the purpose. I preferably add, however, any waste combustible material which is available and suitable for admixture with the liquor or liquid to be treated, although I may employ substantially any combustible material which will serve to increase the heat value of the material treated in cases in which the heat value of the latter is very low or in which treatment to increase the heat value of the material is desirable.

Considerable difficulty has been experienced with the usual process for the burning of coal dust in which coal or coke is pulverized and then sprayed into a combustion chamber in which it is burned. In order to permit spraying of the pulverized coal or coal dust, it is necessary to have the material very dry and it is generally necessary to employ some drying means whereby the moisture content of the coal may be sufficiently reduced to permit spraying thereof. By the use of my process, however, the drying of the pulverized coal which involves considerable expense, may be obviated. Instead of drying the pulverized coal, in the use of my process, I add water or oil thereto to obtain a heavy mud or sludge of such a consistency that it may be readily pumped or passed through pipes. After the sludge has been made I preferably pump the material into my apparatus, the sludge being preferably preheated to about 120° F. or thereabouts so as to decrease the friction in the pipes, and it is then passed into contact with superheated steam or a gas in the manner heretofore described. The material is then passed intermittently to the burner or into the chamber in which combustion takes place, or into storage or condensation chambers for treatment.

I have found that the "black liquor" formed in the manufacture of paper by the sulphite process may be readily treated so that it may be disposed of by adding a highly combustible material such as coal dust or sludge made from coal dust or dust refuse containing carbonaceous material. A considerable amount of this dirt, sludge or dust refuse is added to the "black liquor" so as to produce a suspension in said liquor and the resultant liquid may be readily pumped through the apparatus and burned. If the material treated contains inorganic constituents which may be recovered, such as caustic soda which is usually recovered by burning "black liquor" from the soda process in the treatment of wood to produce soda pulp, such products may be recovered by being collected from the floor of the combustion chamber, or the combustion gases produced through the combustion of the material treated may be passed through scrubbing towers so as to recover any soluble constituents present in the gases of combustion. The particular method employed for the recovery of the by-products such as soda ash or sulphur dioxide or other recoverable constituents depends upon the particular material to be recovered as will be apparent to those skilled in the art and the particular methods which may be employed will, therefore, not be described in detail.

It will be understood that various changes or modifications may be made in the present process for the treatment of waste liquors containing combustible material without departing from the spirit or scope of the invention as defined in the claims. It is to be understood that I preferably utilize the heat of combustion of the material by passing the combustion gases into contact with any body to be heated such for example, as a steam boiler or still or other body, although I may if desired, treat the material merely for the disposal thereof without utilizing the heat of combustion, or using only a part thereof.

The terms "liquor" and "liquid" employed herein are intended to include any liquid containing combustible material whether in the form of an emulsion or whether said liquid contains solid material in suspension or combustible materials in solution.

What is claimed as new is:

1. A process of treating carbonaceous material, which comprises forcing said material and superheated steam into a substantially closed heated chamber, maintaining the temperature of the chamber at or above the kindling temperature of the hydrocarbons in the material, maintaining pressure in the chamber, producing continuous and simultaneous variations in pressure, temperature, velocity of travel and concentration of the resultant gases in the chamber, and discharging the gases from the chamber.

2. A process of treating carbonaceous material which comprises preheating steam above the kindling point of hydrocarbons in the material, forcing the material and preheated steam into a substantially closed heated chamber, maintaining the temperature of the chamber at or above the said kindling point, maintaining pressure in the chamber, producing continuous and simultaneous variations in the pressure, temperature, velocity of travel and concentration of the resultant gases in the chamber, and discharging the gases from the chamber.

3. A process of treating carbonaceous material containing a substantial amount of water, which comprises forcing said material and superheated steam into a substantially closed heated chamber, maintaining the temperature of the chamber near, at or above the kindling temperature of the combustibles in the material, maintaining pressure in the chamber and producing continuous and simultaneous variations in pressure, temperature, velocity of travel and concentration of the resultant gases in the chamber, feeding the gases from the chamber into contact with air and burning the same.

4. A process of treating carbonaceous material with a water content as high as 50%, which comprises bringing said material into contact with superheated gas in a substantially closed heated chamber, maintaining the material in said chamber at a temperature sufficiently high to vaporize the water in said material and to maintain said material at or above the kindling temperature of the said carbonaceous material and feeding the resultant gases intermittently from the chamber into contact with air and burning the same.

5. A process of treating carbonaceous material, which comprises bringing said material into contact with superheated gas in a substantially closed heated chamber, maintaining the material in said chamber at a temperature sufficiently high to vaporize the water in said material and to maintain said material at or above the kindling temperature of the said carbonaceous material, and producing continuous and simultaneous variations in pressure, temperature, velocity of travel and concentration of the mixture in the chamber.

6. A process of treating carbonaceous material, which comprises bringing said material into contact with superheated gas in a substantially closed chamber and producing continuous and simultaneous variations in pressure, temperature, velocity of travel, and concentration of the mixture in the chamber and heating the chamber to a temperature to maintain the mixture of gases therein at, near or above the kindling temperature of the carbonaceous material under the existing conditions.

7. A process of treating carbonaceous material, which comprises preheating the material, bringing the material into contact with superheated gas and producing continuous and simultaneous variations in pressure, temperature and concentration of the mixture of gases thus produced.

8. A process of treating carbonaceous material, which comprises preheating the material, bringing the material into contact with superheated gas in a substantially closed chamber and discharging the resultant gases intermittently from the chamber.

9. A process of treating carbonaceous material, which comprises bringing said material into contact with superheated gas in a heated chamber, producing continuous and simultaneous variations in pressure, temperature, velocity of travel and concentration of the mixture in the chamber, bringing said mixture into contact with a catalytic agent and discharging the resultant gases from the chamber.

10. A process of treating carbonaceous material, which comprises bringing said material into contact with superheated gas in a closed chamber, producing continuous and simultaneous variations in pressure, temperature, velocity of travel and concentration of the mixture of vapors and gases in the chamber, bringing said mixture in the chamber into contact with a catalytic agent and heating the chamber to maintain the mixture of gases therein near, at or above the kindling temperature of the carbonaceous material.

11. A process of treating carbonaceous material, which comprises bringing said material into contact with superheated gas, producing continuous and simultaneous variations in pressure, temperature, velocity of travel and concentration of the mixture of gases, and subjecting said mixture to the action of a catalytic agent.

12. A process of treating carbonaceous material, which comprises forcing said material and superheated gas into a closed heated chamber, maintaining pressure in the chamber, producing continuous and simultaneous variations in pressure, temperature, velocity of travel and concentration of the resultant gases in the chamber, causing the said gas and carbon from the material to pass alternately into contact with a catalytic agent, and discharging the gases from the chamber.

13. A process of treating carbonaceous material, which comprises forcing said material and superheated gas into a closed heated chamber, maintaining the temperature of the chamber at or above the kindling temperature of the combustibles in the material, maintaining pressure in the chamber, producing continuous and simultaneous variations in pressure, temperature, velocity of travel and concentration of the resultant gases in the chamber, bringing the mixture of gases in the chamber into contact with a catalytic agent, and discharging the gases from the chamber.

14. A process of treating carbonaceous material, which comprises preheating a gas above the kindling point of the combustibles in the material, forcing the material and the preheated gas into a closed heated chamber, maintaining the temperature of the chamber at or above the said kindling point, maintaining pressure in the chamber, producing continuous and simultaneous variations in the pressure, temperature, velocity of travel and concentration of the resultant gases in the chamber, and causing the said gas and the carbon from the material to pass alternately over a catalytic agent.

15. A process of treating emulsions containing combustible material and water of a content as high as 50%, which comprises bringing the said emulsion into contact with superheated gas in a substantially closed chamber, maintaining the emulsion in said chamber at a temperature sufficiently high to vaporize the water in the emulsion and to maintain it at or above the kindling temperature of the combustible material, and feeding the resultant gases intermittently from the chamber into contact with air and burning the same.

16. A method for utilizing residue oils containing water as high as 50%, which comprises preheating the oil and water mixture under pressure in a chamber to a temperature at which the water is changed to superheated steam, thereafter passing superheated steam into the mixture at a temperature sufficient to raise the temperature of the mixture to the ignition temperature of the oil and feeding the resultant gases intermittently from the chamber into contact with air and burning the same.

17. The process of treating emulsions containing carbonaceous material and water which comprises feeding the emulsion into a substantially closed chamber, supplying sufficient heat to vaporize the water and to raise the temperature to a point at or near the kindling temperature of the hydrocarbons in the material and producing successive variations in pressure of the resulting gases in the chamber.

18. The process of treating carbonaceous material which comprises forcing said material and superheated steam into a substantially closed heated chamber, maintaing the temperature of the chamber at or near the kindling temperature of the hydrocarbons in the material and producing successive and simultaneous variations in pressure and temperature of the resulting gases in the chamber.

19. A process of treating carbonaceous material which comprises preheating the material, bringing the material into contact with a superheated gas and producing successive and simultaneous variations in the pressure and temperature of the mixture of gases thus produced.

Signed at New York, N. Y., this 17th day of November, 1926.

ARLINGTON H. MALLERY.